Jan. 2, 1940.　　　　K. D. KYSOR　　　　2,185,636
TORQUE RELEASE DEVICE FOR FOUR-WHEEL DRIVE
Original Filed Sept. 23, 1936　　3 Sheets-Sheet 2
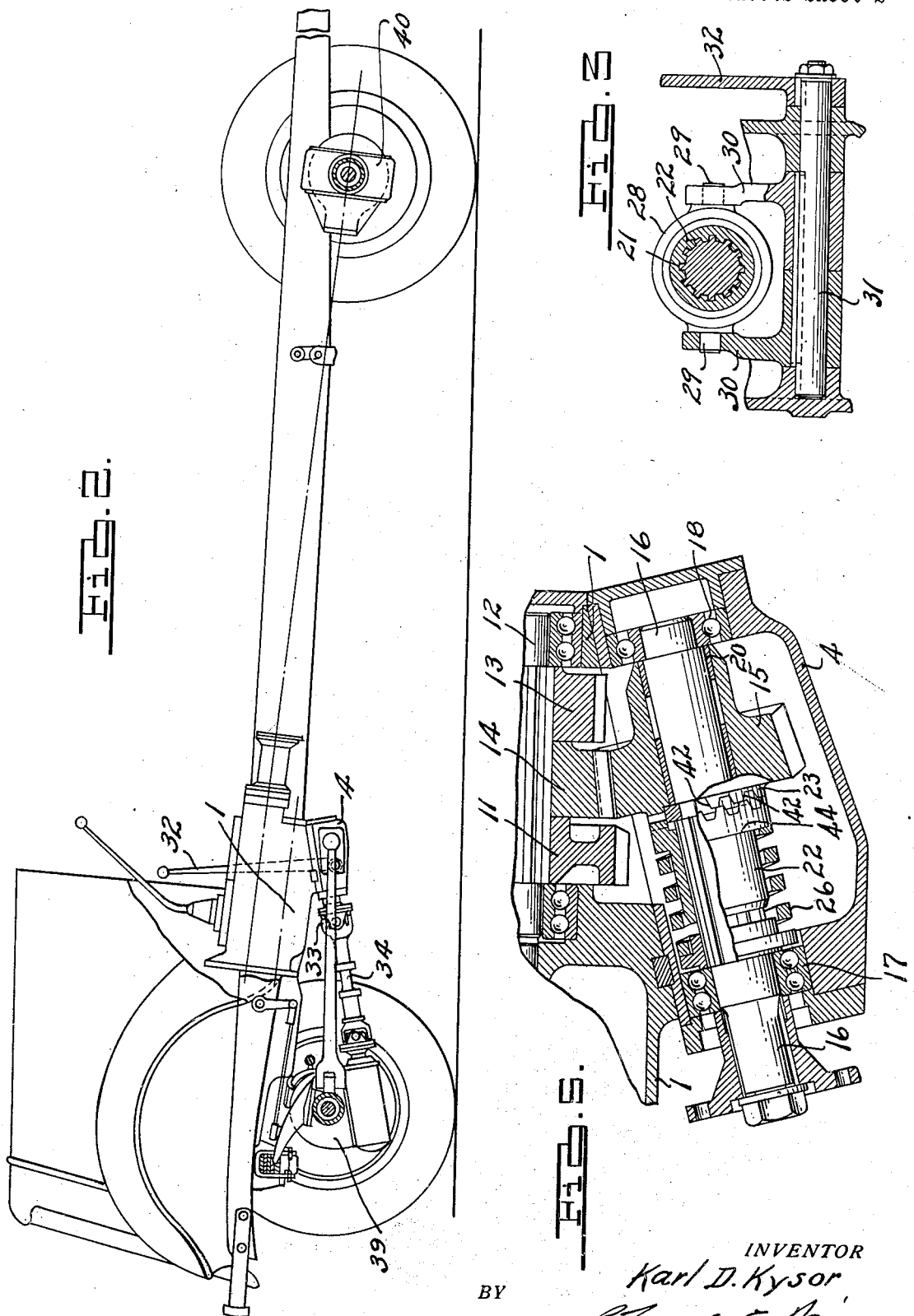
INVENTOR
Karl D. Kysor,
BY
ATTORNEY

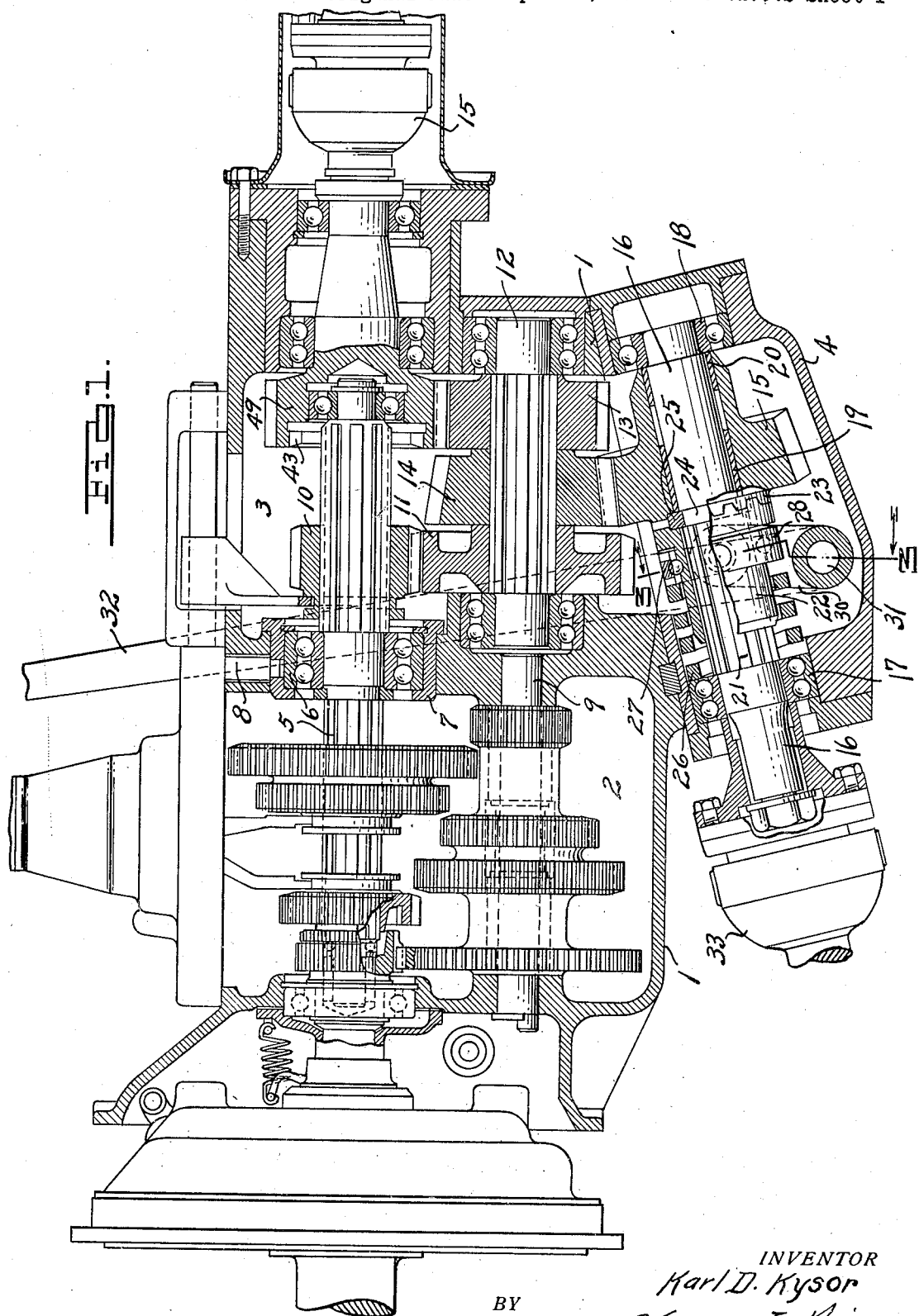

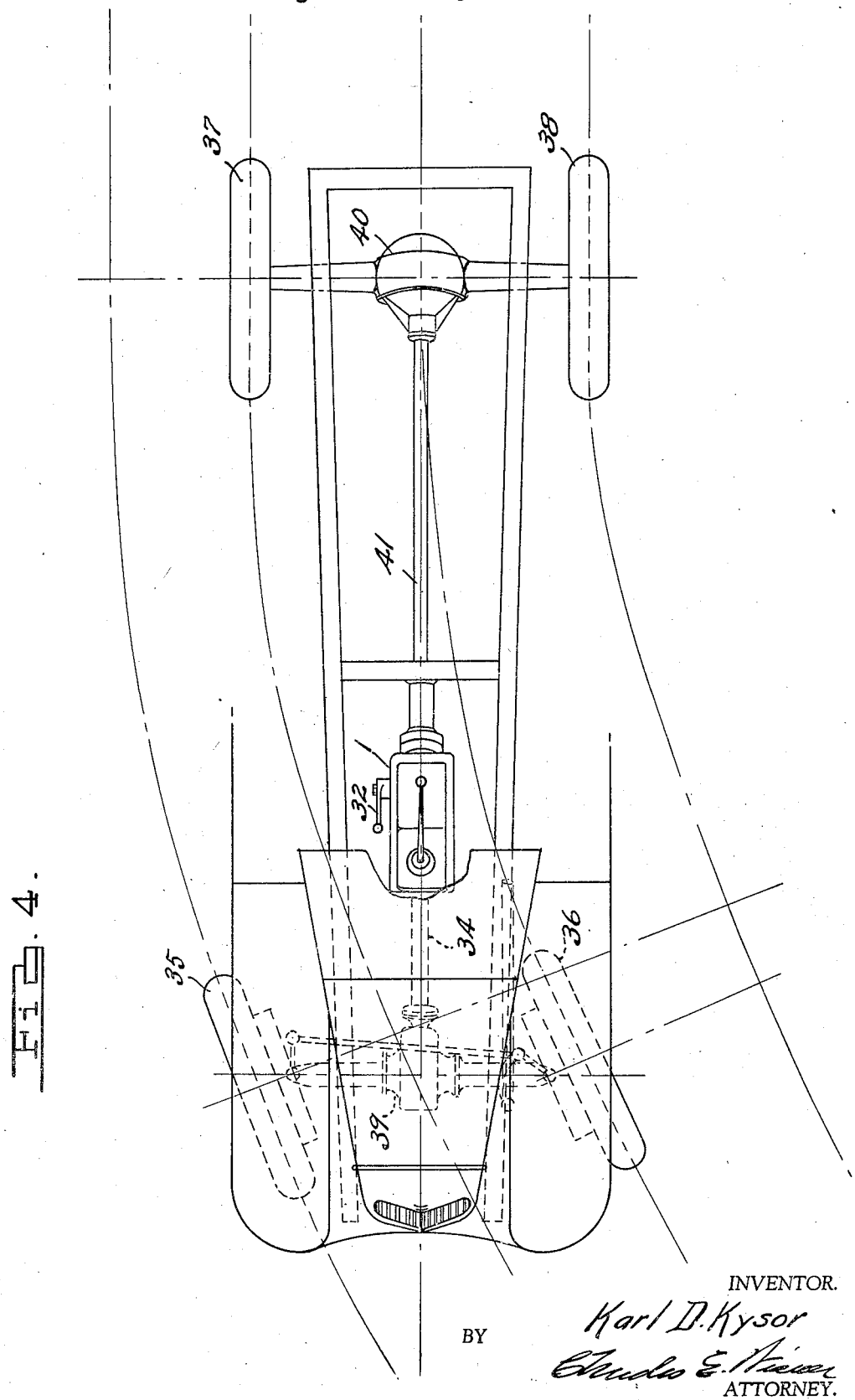

Patented Jan. 2, 1940

2,185,636

UNITED STATES PATENT OFFICE 2,185,636

TORQUE RELEASE DEVICE FOR FOUR-WHEEL DRIVES

Karl D. Kysor, Northville, Mich.

Application September 23, 1936, Serial No. 102,070
Renewed June 18, 1938

6 Claims. (Cl. 180—44)

This invention relates to torque release devices for four-wheel drives and the object of the invention is to provide a device which will automatically release and relieve the accumulated torque between the front and rear axles of a four-wheel drive and, at the same time, will maintain a positive drive to both front and rear axles.

Another object of the invention is to provide a jaw clutch in which the two clutch members are maintained in engagement by a spring and in which the pressure angles of the teeth of the clutch members and the compression of the spring are so arranged that upon the accumulation of excessive reactions between the front and rear wheel driving shafts the clutch members will automatically disengage and re-engage immediately thereafter to hold driving torque on both the front and rear axles.

Another object of the invention is to provide a four-wheel drive mechanism in which the drive to the front wheels is through a shaft equipped with the automatic torque release device so that the normal drive to the rear wheels is direct and the drive to the front wheels is through the torque release device.

A further object of the invention is to provide a torque release device of the character described which may be manually disengaged, if desired, to allow the vehicle to be driven by the rear wheels only.

A further object of the invention is to provide a unit transmission including transmission gearing, transfer gearing and a front wheel drive shaft driven from the transfer gearing and including the automatic torque release device in which all of the parts are mounted in a single housing.

These objects and the several novel features of the invention are hereinafter more fully described and claimed and the preferred form of construction by which these objects are attained is shown in the accompanying drawings in which—

Fig. 1 is a longitudinal section through the housing for the transmission and transfer gearing and torque release device.

Fig. 2 is a view showing the arrangement of parts in a truck.

Fig. 3 is a reduced section taken on line 3—3 of Fig. 1.

Fig. 4 is a diagrammatic view illustrating the manner in which torque is accumulated between the front and rear axles.

Fig. 5 is a section through an alternative form of the torque release device.

The details of the mechanism are shown more particularly in Fig. 1 and this mechanism comprises a housing 1 formed to provide a transmission gear compartment 2 and a transfer gear compartment 3 and a housing cover 4 is secured to the bottom of the housing 1 beneath the transfer gear compartment and carrying the automatic torque release device. A main shaft 5 is shown which extends through the transmission gear compartment 2 and the transfer gear compartment 3 and this main shaft is rotatably mounted in a double row ball bearing 6 mounted in a cage 7 which is locked in place by the shoulder screw 8. Within the compartment 2 is a series of transmission gears on the splined main shaft 5 and these transmission gears are arranged to be brought into mesh with the companion gears on the countershaft 9.

Within the transfer gear compartment 3 is a gear 10 which is slidably mounted on the splines of the main drive shaft 5 and this gear 10 normally meshes, in the creeper gear position, with a gear 11 on the countershaft 12 which is rotatably mounted in the lower part of the transfer gear compartment 3. Also mounted on the splined countershaft 12 is a gear 13 meshing with the stem pinion 49 and this stem pinion 49 is connected by means of a universal joint 15 with the propeller shaft 41 for the rear axle shown in Fig. 4. Mounted on the splined countershaft 12 between the gears 11 and 13 is an acute angle bevel gear 14 which meshes with an acute angle bevel gear 15 in the housing cover 4. A shaft 16 is rotatably mounted in the housing cover 4 at one end on the double roll ball bearing 17 and at the opposite end on the ball bearing 18. The acute angle bevel gear 15 is rotatably mounted on bushings 19 and 20 on the shaft 16 and this shaft 16 is provided with a splined portion 21 on which a jaw clutch member 22 is slidably mounted. This jaw clutch member 22 meshes with a companion jaw clutch member 23 which may be an integral part of the acute angle bevel gear 15 and the shaft 16 is provided with an annular groove 24 into which a hardened and ground steel snap ring 25 is fitted. This limits endwise movement of the clutch member 22 so that the thrust of the spring 26 is carried into the shaft 16 and thence to the ball thrust bearing 18 which provides an ideal condition.

The gear 15 has a few thousandths axial clearance between the snap ring 25 and the bearing 18 but, in normal operation, rotates in the same direction and at the same angular velocity as the shaft 16 so that there is no continuous relative motion between the gear 15 and the snap ring 25. The coiled spring 26 engages against the stationary outer member of the double roll ball bearing 17 at one end and at the opposite end engages against the ring 28. This ring 28 is provided with a threaded plug 27 which may be removed to allow the ring to be filled with balls and these balls rest in an annular groove provided therefor in the clutch member 22 so that axial movement of the ring 28 in either direction will move the clutch member 22 therewith. This ring 28 as shown in Fig. 3 is provided with a pair of trunnion pins 29 on opposite sides thereof and these pins extend into yoke arms 30 as shown in Fig. 3. These yoke arms 30 are keyed to the shaft 31 and a lever 32 is secured to the shaft 31 as shown in Figs. 1 and 3 so that the lever 32 may be shifted to engage or disengage the clutch member 22 with the clutch member 23 on the gear 15. Secured to the left end of the shaft 16 is a universal joint 33 and the front wheel drive shaft 34 extends from this universal joint to a second universal joint which is connected to the differential 39 for driving the front wheels as will be understood from Fig. 2.

In Fig. 4, I have illustrated a four-wheel drive vehicle traveling through the arc of a circle. The front wheels 35 and 36 are traveling on a greater radius than the rear wheels 37 and 38. It is also to be noted that the front wheel 36 and the rear wheel 37 are traveling in a greater radius than the rear wheel 38. The difference in travel between the front wheels 35 and 36 is compensated for in the front axle differential 39 while the difference in rotation between the rear wheels 37 and 38 is taken care of by the rear axel differential 40. It will also be noted that the front axle drive shaft 34 under this condition will be rotated at a greater speed than the propeller shaft 41, due to the fact that the sum of the revolutions of the two front wheels is greater than the sum of the revolutions of the two rear wheels. In order to allow this, a bevel gear differential might be used between the acute angle bevel gear 15 and the front wheel drive shaft 16. This is, however, open to the objection that in case of any wheel of the vehicle slipping, no driving force can be transmitted to any of the other three wheels since all of the motion will go to the free wheel. Consequently, it is necessary to use a semi-locking differential between these parts. In this case, the clutch member 22 meshing with the clutch member 23 of the acute angle bevel gear 15 acts as a semi-locking differential. The faces of these inter-engaging teeth are so arranged that the pressure angles of the teeth in combination with the tension of the coil spring 26 will allow the clutch to disengage.

In a situation like that illustrated in Fig. 4, the torque would build up in the front axle drive shaft 34 until the accumulated torque has attained sufficient pressure that the pressure angles 42 of the inter-engaging teeth will force the clutch member 22 to the left of Fig. 1 against the tension of the spring 26 and allow this clutch member 22 to ratchet over the teeth 23 of the gear 15 until the torque is relieved. The pressure required to cause the clutch member 22 to throw out may be accurately determined by the tension of the spring 26 and the pressure angles of the inter-engaging teeth of the two clutch members. This device will also operate in the same manner when the rear axle propeller shaft tends to run ahead of the front axle propeller shaft except that the pressure angles on the opposite sides of the teeth will act to throw the clutch member 22 out of engagement. It will be noted that the clutch members 22 and 23 will remain engaged as long as the torque transmitted does not exceed the amount required to force the member 22 to move away from the clutch teeth 23 against the pressure of the spring 26 due to axial force reaction set up by the inclined faces or pressure angles 42 of the clutch members 22 and 23. In this device, the torque will be transmitted equally to both axles under normal conditions. In case of wheel slippage at the rear, the torque will be transmitted to the front axle and in case of wheel slippage at the front the torque will be transmitted to the rear axle.

In turning a corner, when the front wheel drive shaft tries to run ahead of the rear axle propeller shaft, the torque built up in the front axle drive shaft will soon pass the point for which the clutch members 22 and 23 are set and cause them to slip past each other thus greatly reducing the strains in the front wheel drive mechanism. As soon as driving torque is again needed at the front wheels, the clutch members 22 and 23 will immediately re-engage since the action of the spring 26 is always driving them toward each other and the vehicle will proceed with power on all four wheels. It will also be seen that wheel slippage at the front cannot take the driving effort off the rear wheels nor can wheel slippage at the rear take the driving effort off the front wheels as would be the case with an ordinary type center differential used between the rear axle propeller shaft and front axle drive shaft.

For ordinary driving on a hard surface road, it is only necessary to drive the two rear wheels. To do this, the lever 32 may be thrown forward to move the clutch member 22 out of engagement with the clutch teeth 23. At this time, the sliding pinion 10 may be moved to the right of Fig. 1 and telescoped into the internal teeth 43 of the stem pinion 49. This gives a direct drive from the main drive shaft 5 to the rear axle propeller shaft and at this time the gears 11, 13, 14 and 15 will rotate idle without transmitting any torque.

This condition of direct drive to the rear wheels only, comprises a large percentage of the operation of the vehicle, and the disengagement of the clutch members 22 and 23 during direct drive operation will greatly prolong the life of the gears in the transfer case or compartment 3. This construction also allows quieter operation at high speeds on smooth highways and it is obvious that this throw out mechanism allows the power to be transmitted to the rear axle from the engine with no intermediate gears running under power and in all respects will be the same as a conventional rear wheel driven vehicle. This is an ideal condition for maximum economy of operation with light loads at high speeds on smooth, level highways and is one of the important requirements for satisfactory truck operation and, at the same time, the front wheel drive may be readily brought into action by moving the pinion 10 back to the position shown in Fig. 1 and moving the lever 32 to allow re-engagement of the clutch member 22 with the clutch teeth 23.

In some cases, it may be desired to drive all four wheels of the truck at all times. In this situation it is not necessary to provide the throw out lever 32 together with its yoke and ring 28. This construction is shown in Fig. 5 in which the clutch member 22 is provided with the spring 26 fitting against the shoulder 44 on said clutch member. In this form of the device, all four wheels are driven and the ratcheting action is entirely automatic between the clutch members depending as before on the pressure angles 42 of the teeth of the clutch members 22 and 23 and on the tension of the spring 26.

From the foregoing description it becomes evident that the device is very simple and efficient in operation, will automatically relieve the torque built up between the front and rear wheel drive mechanisms, provides a means whereby the front wheel drive may be disengaged at will and provides a device which accomplishes the objects described.

Having thus fully described my invention, its utility and mode of operation, what I claim and desire to secure by Letters Patent of the United States is—

1. In a torque release device for four-wheel drives including a transmission, a rear axle propeller shaft driven by the transmission, transfer gearing driven from the transmission, an acute angle bevel gear driven by the transfer gearing, a front axle drive shaft, an acute angle bevel gear rotatably mounted on the front axle drive shaft and meshing with the aforesaid acute angle bevel gear, a clutch member formed integrally with the acute angle bevel gear on the front axle drive shaft, the front axle drive shaft being provided with a splined portion, a clutch member fitting said splined portion and movable longitudinally of the shaft into engagement with the clutch member of the acute angle bevel gear, a spring urging said slidable clutch member into engagement with the gear clutch member, the two clutch members being provided with inter-engaging teeth and the pressure angles of the inter-engaging teeth being so arranged as to force the slidable clutch member out of engagement with the gear clutch member upon accumulation of a predetermined torque in either the front axle drive shaft or rear axle propeller shaft.

2. In a torque release device for four-wheel drives including a transmission, a rear axle propeller shaft driven by the transmission, a front axle drive shaft, a gear rotatably mounted on the front axle drive shaft and driven from the transmission, a clutch jaw formed integrally with said gear and provided with teeth, a clutch member rotatable with the front axle drive shaft and movable longitudinally thereof, said clutch member being provided with teeth for engagement with the teeth of the gear clutch jaw, a spring urging the clutch member toward the gear clutch jaw, the tension of the spring and the pressure angles of the inter-engaging teeth being so arranged as to force the clutch member out of engagement with the gear clutch jaw upon accumulation of a predetermined torque between the rear axle propeller shaft and the front axle drive shaft, a ring rotatably mounted on the clutch member, a yoke connected to said ring and a lever for turning the yoke to move the clutch member out of engagement with the gear clutch jaw against the tension of said spring.

3. In a torque release device for four-wheel drives including a transmission, a rear axle propeller shaft driven by the transmission, a front axle drive shaft, a gear driven by the transmission and rotatably mounted on the front axle drive shaft and having a clutch jaw provided with teeth, a clutch member rotatable with the front axle drive shaft and movable longitudinally thereof, said clutch member being provided with teeth for engagement with the teeth of the gear clutch jaw, a spring urging the clutch member toward the gear clutch jaw, the tension of the spring and the pressure angles to the inter-engaging teeth being so arranged as to move the clutch member out of engagement with the gear clutch jaw upon accumulation of a predetermined torque between the rear axle propeller shaft and the front axle drive shaft, and a pivotally mounted lever connected to said clutch member and movable in one direction to disengage the clutch member from the gear clutch jaw against the tension of the clutch spring.

4. In a torque release device for four-wheel drives, a transmission, a rear axle propeller shaft driven by the transmission, a front axle drive shaft, a gear for driving the front axle drive shaft driven from the transmission, a clutch member carried by the gear, a second clutch member rotatable with the front axle drive shaft and slidable into engagement with the first clutch member, spring means urging the second clutch member into engagement with the first clutch member, the two clutch members being provided with inter-engaging teeth having pressure angles arranged to move the clutch members apart upon accumulation of predetermined torque between the front axle drive shaft and the rear axle propeller shaft.

5. In a torque release device for four-wheel drives including a transmission, a rear axle propeller shaft driven by the transmission, a front axle drive shaft, a gear driven by the transmission and rotatably mounted on the front axle drive shaft and having a clutch jaw provided with teeth, a clutch member rotatable with the front axle drive shaft and provided with teeth for engagement with the teeth of the gear clutch jaw, a spring urging the clutch member toward the gear clutch jaw, the tension of the spring and the pressure angles of the inter-engaging teeth being so arranged as to move the clutch member out of engagement with the gear clutch jaw upon accumulation of a predetermined torque between the rear axle propeller shaft and the front axle drive shaft.

6. A torque release device for four wheel drives, comprising a rear axle propeller shaft, a front axle drive shaft, a speed changing power transmission positioned between the shafts and comprising, in a unitary structure, a driven shaft, a counter shaft parallel with the driven shaft and positioned therebelow in substantially the same vertical plane, a gear slidable on the driven shaft and adapted to directly connect the driven and rear axle propeller shafts, a gear on the rear axle propeller shaft, a gear on the counter shaft with which the said gear on the driven shaft may engage when moved from direct connection with the gear on the rear axle propeller shaft, a second gear on the counter shaft constantly in mesh with the gear on the propeller shaft, a bevel gear on the counter shaft, a companion bevel gear on the front axle drive shaft permitting the front axle drive shaft to occupy a position at an angle to the driven and the counter shafts, a clutch device having a part fixed to the beveled gear on the front axle drive shaft and a part rotatable with and slidable thereon, and a spring tending to hold the clutch parts together, the two clutch parts having inter-engaging teeth formed with such pressure angle as to cause the clutch members to separate upon accumulation of torque between the front axle drive shaft and the rear axle propeller shaft sufficient to overcome the spring tension.

KARL D. KYSOR.